United States Patent [19]

Slaugh

[11] Patent Number: 4,683,218

[45] Date of Patent: Jul. 28, 1987

[54] CHLORINE RESISTANT SHIFT GAS CATALYST

[75] Inventor: Lynn H. Slaugh, Cypress, Tex.

[73] Assignee: Shell Oil Company, Houston, Tex.

[21] Appl. No.: 863,271

[22] Filed: May 15, 1986

[51] Int. Cl.$^4$ .................. B01J 23/02; B01J 23/06; B01J 23/10; B01J 23/72

[52] U.S. Cl. .................................. 502/302; 423/656

[58] Field of Search .................. 502/302, 303, 304; 423/656

[56] References Cited

U.S. PATENT DOCUMENTS 3,922,337  11/1975  Campbell et al. .................. 423/656
4,257,920  3/1981  Sugier et al. .................. 502/302

OTHER PUBLICATIONS

Newsome, D. S., Catal. Rev.-Sci. Eng., 21(2) pp. 296–302 (1980).

Primary Examiner—W. J. Shine

[57] ABSTRACT

The water gas shift reaction can be advantageously carried out in the presence of catalyst-poisoning, chloride-containing compounds by utilizing a catalyst comprising copper, zinc, a rare earth element and an alkaline earth element wherein such alkaline earth element is present in an amount from about 10 to about 30 atomic weight percent of the total metals present.

2 Claims, 1 Drawing Figure

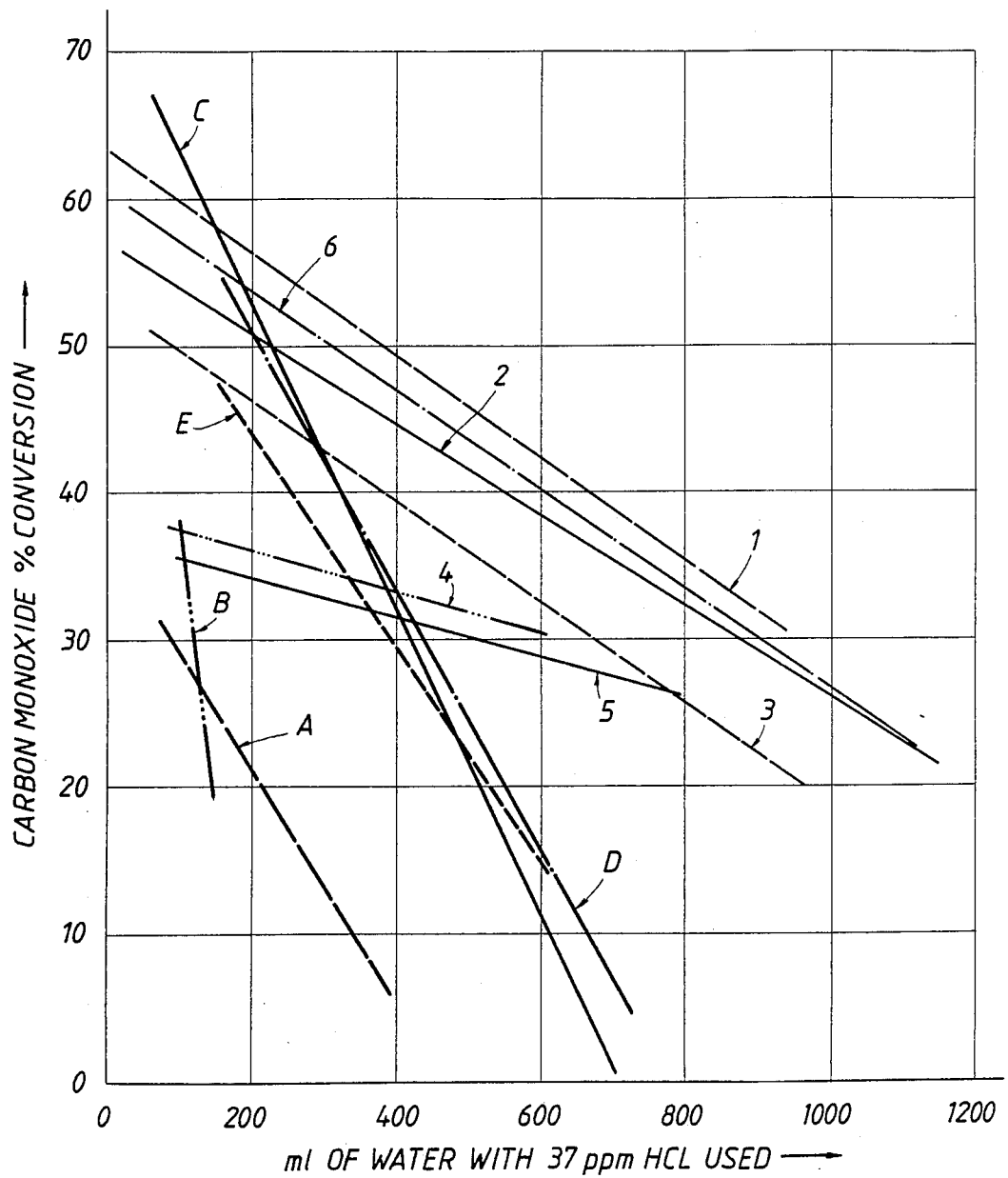

4,683,218

CHLORINE RESISTANT SHIFT GAS CATALYST

FIELD OF THE INVENTION

This invention relates to catalysts comprising copper, zinc, a lanthanum element, and an alkali earth element which catalysts are used in the shift gas reaction for the conversion of carbon monoxide and steam to hydrogen and carbon dioxide. The instant catalyst compositions have a high resistance to poisoning by chlorine compounds.

BACKGROUND OF THE INVENTION

Copper-based low temperature shift catalysts have been well studied in the art. For example, see the article "The Water Gas Shift Reaction" by David S. Newsome, CATAL. Rev.-SCI. ENG., 21(2), 275-318 at pp. 296-303 (1980). The above referenced article also indicates that oxides of calcium and magnesium have been added to copper-zinc-chromium catalysts with inconsistent results with regard to activity and temperature stability.

It has been found that when a rare earth promoter and an alkaline earth compound is added to a copper-zinc catalyst, the resulting composition has an enhanced activity and a high resistance to poisoning by chlorine-containing compounds.

SUMMARY OF THE INVENTION

The instant invention relates to a catalyst composition to be used for the conversion of carbon monoxide and steam to hydrogen and carbon dioxide. The composition comprises copper, zinc, a rare earth element, and an alkaline earth element present in the amount from about 5 to about 30 atomic weight percent basis total metals present. The instant compositions have high activities and are very resistant to poisoning by chlorine-containing compounds.

BRIEF DESCRIPTION OF THE DRAWING

The FIGURE illustrates the results of accelerated life tests on catalysts of the instant invention and comparative catalysts for the water gas shift reaction carried out in the presence of a chlorine-containing compound.

DESCRIPTION OF THE PREFERRED EMBODIMENTS

The catalyst compositions of the instant invention comprise a mixture of copper, zinc, a lanthanum or rare earth element, and alkaline earth metal. As used herein the term "lanthanum element" and "rare earth element" refers to one or more elements selected from the Lanthanide series of the periodic table. This series includes those elements containing atomic numbers from 57 through 71 inclusive. As used herein term "alkaline earth element" refers to one or more elements selected from the alkaline earth series of the period table. This series comprises elements of atomic numbers 12, 20, 38 and 56. Because of toxicity and radioactivity problems the elements numbers 4 and 88, beryllium and radium, have been excluded from the definition of alkaline earth elements for purposes of this invention. The catalysts may optionally contain chromium.

The relative proportions of copper to zinc to be employed in the catalyst compositions can be varied. In general, atomic ratios from about 1:10 to about 10:1 are satisfactory. The amount of rare earth element modifier added to the catalyst typically range from about 0.1 to about 10 atomic w% calculated on the basis of the total metals present. It is believed that the use of the rare earth element added to the instant catalysts provide for their high activity. Mixtures of rare earth elements may be suitably utilized and these mixed earth metals are readily available commercially. A suitable example of a mixed metal available commercially is the so called "didymium" metal. The composition of didymium is described in U.S. Pat. No. 3,758,417, issued Sept. 11, 1973, incorporated by reference herein. Another commercially available preparation of mixed rare earth metals is that known as "misch-metal". Other mixtures of rare earth are also available.

The amount of alkaline earth element to be added to the catalyst of the instant invention is critical. Below the critical amount, insufficient alkaline earth metal is available to provide significant resistance to chlorine-containing compounds. Excess alkaline earth metals can cause a loss in activity as well as an increased sensitivity to chlorine-containing compounds.

The initial form in which the copper, zinc, rare earth and alkaline earth are employed is the oxide, although compounds which are readily converted to the oxide, e.g., the corresponding metal carbonates, bicarbonates, etc., are also suitably initially employed as these are converted to the oxide during the calcination step utilized in the preparation of the catalyst. Prior to use, the catalyst will be reduced in an hydrogen or other reducing atmosphere in order to activate it for the water gas reaction. Under appropriate conditions the prereduction may occur in situ in a water gas reactor. The treatment of the catalyst in the reducing atmosphere such as hydrogen or carbon monoxide will cause at least a partial reduction of some of the metals to lower oxidation states and it is intended that the catalyst compositions both in the oxidized state and in the aforementioned reduced state will fall within the scope of this invention. The compositions of the instant invention are prepared by routine precipitation techniques that traditionally are utilized for catalyst preparation. The catalyst may be prepared in one complete precipitation step by precipitating all the metals in the catalyst at one time. Alternatively, the precipitation step may be carried out sequentially. For example, the basic copper-zinc catalyst may be initially precipitated and a solution of rare earth and alkaline earth salts added to the precipitate which is then slurried and the rare earth and alkaline metal compounds precipitated by the addition of a precipitating agent. In a preferred method copper, zinc and the rare earth element is precipitated from an aqueous solution with a precipitating agent which is preferably an alkali metal or ammonium carbonate or bicarbonate. After the precipitate has been collected, it is then reslurried in a solution containing a solubilized alkaline earth metal salt and this slurry is again precipitated utilizing a precipitating agent such as for example, an alkali metal or ammonium carbonate or bicarbonate. Precipitates thus obtained are mixtures of carbonates, basic carbonates, bicarbonates and hydroxides. While the catalysts typically comprise the catalyst metals in the bulk oxide form, these metals can also or suitably precipitated on a inert carrier such as alumina or a zinc aluminate. The final precipitate is washed substantially free of electrolytes, then dried and subsequently calcined at a temperature ranging from about 200° C. to about 400° C., a temperature of about 250° C. to about 350° C. being preferred. The drying is carried out at a temperature sufficient to remove the water. This drying step is conveniently combined with the calcination step by a suitable programming of a temperature from room temperature, slowly through the drying temperature, and then up to the calcination temperature. The calcined material is shaped prior to or after calcination, for example, by pelleting under pressure or by extrusion utilizing suitable extrusion lubricants. The oxide mixture is pretreated in a hydrogen-containing atmosphere prior to use as a catalyst to bring it to its most active state. Pretreatment is accomplished by contacting the catalyst with a stream of hydrogen or hydrogen mixed with an inert gas or diluent at a temperature ranging from about 175° C. to about 400° C. Suitable diluent gases for the activating gas mixture comprise nitrogen, or oxides of carbon.

The activity of the catalysts prepared by the above described techniques will vary depending on variables selected in preparing them. Precipitation conditions, such as, for example, participation temperature and pH, aging temperature and pH, can all effect the activity of the catalyst. However, these can be easily optomized by having those skill in the art utilizing conventional techniques.

Industrial process streams containing carbon monoxide for which the water gas shift reaction is to be applied invariably contain chlorine-containing compounds either as organic and/or inorganic compounds. These chlorine-containing compounds are in either in the original feedstocks or picked up during the processing of these feedstocks to produce the carbon monoxide-containing streams. These chlorine-containing compounds are very difficult to remove from the streams and a water gas shift catalyst must be confronted with these compounds. Traditional water gas shift catalysts are quite sensitive to chlorine-containing compounds. The catalysts of the instant invention, however, provide for an enhanced life over traditional catalysts when subjected to chorine-containing compounds in the feed. Thus, one aspect of the instant invention is an improved process for the conversion of carbon monoxide and steam to hydrogen and carbon dioxide which comprises contacting a gaseous mixture containing carbon monoxide, steam and chlorine-containing impurities with a catalyst comprising copper, zinc, a rare earth element and an alkaline earth element which alkaline earth element contains from about 5 to about 30 atomic weight percent of the alkaline earth element per total metals present in the catalyst. Typical shift gas reaction temperatures range from about 150° C. to about 350° C. Since the catalysts are sensitive to water, it is necessary to maintain the temperature of the reacting gaseous mixture above its dew point, preferably greater than about 10° C. above its dew point by suitable adjustmeht of the temperature and/or pressure. The higher the reaction temperature, the higher the pressure that can be utilized. Depending on the reaction temperature, suitable pressures can be determined by routine experimentation.

The shift gas process is preferably carried out continually utilizing a packed bed reactor. The gaseous hourly space velocity can vary within wide limits. Gaseous hourly space velocities of at least 300 volumes of feed per volume of supported catalyst per hour (V/V/Hr), preferably space velocities between about 300 and 30,000 V/V/Hr, are particularly suitable for most applications. The process may be carried out at a higher gaseous space velocity as desired.

In the preferred modes of practice of this invention, carbon monoxide or a gas containing 0.1% or more carbon monoxide by volume, and steam in an amount of about 0.5–100 volume per volume of carbon monoxide, are passed over the catalyst in a reaction zone at a temperature above the dew point temperature of the steam in the reaction mixture and in the range of from about 150° C. to about 350° C. The pressure in the reaction zone is maintained below the dew point pressure of the steam in the reaction mixture and is preferably from atmospheric to about 1500 psig.

The instant invention will be illustrated by the following illustrative embodiments which are provided for illustration only and are not to be construed as limiting the invention.

ILLUSTRATIVE EMBODIMENTS

Catalyst Preparation

The following example illustrates a typical preparation of a catalyst according to the instant invention.

A 500-ml solution containing 120 g of $Cu(NO_3)_2.2\frac{1}{2}H_2O$, 60 g of $Zn(NO_3)_2.6H_2O$ and 6.6 g of $La(NO_3)_3.6H_2O$ was heated to 85° C. in a 1000 ml beaker (Designated solution A). In a separate beaker was placed one molar ammonium carbonate solution at about 40° C. (Designated solution B). These two solutions (A and B) were simultaneously pumped into a stirred 6 liter stainless steel beaker containing 750 ml of distilled water at 70° C. where precipitation occurred. The rates of addition of solutions A and B were controlled so as to maintain the pH at about 6.5 during the operation. The resultant precipitate was aged in the medium at 85° C. for a few minutes, then filtered and washed with distilled water until it was free of salts. The precipitate was placed back in the stainless steel beaker along with 20 g of calcium nitrate in 500 ml of distilled water. The mixture was heated to 80° C. and stirred as one molar sodium carbonate solution was added at such a rate as to maintain a pH of about 9.0–9.5 during the precipitation of calcium carbonate. The resultant precipitated carbonate mixture containing copper, zinc, lanthanum and calcium was filtered, washed with 10 liters of distilled water and dried overnight at 120° C. The dried material was calcined in air at 300° C. for four hours, then compressed under 20,000 psi pressure. The latter was crushed and seived to obtain 20-mesh material for testing. Analysis of the final material indicated 42.0% Cu, 26.0% Zn, 3.3% La and 7.2% Ca.

A similar procedure was used for a variety of water gas shift catalysts where the calcium was replaced with other elements, such as barium, magnesium or strontium. Compositions of catalysts thus produced are given in Table 1.

TABLE 1

WATER GAS SHIFT CATALYST METAL ANALYSIS
AS RELATED TO THE RATE OF DECLINE* OF ACTIVITY BASED ON TREND ANALYSIS

| Catalyst | Wt % CU | Wt % Zn | Wt % La | Wt % Ca | Wt % Nd | Wt % Ba | Wt % Sr | Wt % Mg | Rate of Decline* | Initial CO % Conversion |
|---|---|---|---|---|---|---|---|---|---|---|
| A | 30 | 16.2 | 3.2 | 15.6 | *** | *** | *** | *** | 0.1087 | 40 |
| 1 | 42 | 18 | 3.6 | 8.2 | *** | *** | *** | *** | 0.0352 | 60 |

TABLE 1-continued

WATER GAS SHIFT CATALYST METAL ANALYSIS
AS RELATED TO THE RATE OF DECLINE* OF ACTIVITY BASED ON TREND ANALYSIS

| Catalyst | Wt % CU | Wt % Zn | Wt % La | Wt % Ca | Wt % Nd | Wt % Ba | Wt % Sr | Wt % Mg | Rate of Decline* | Initial CO % Conversion |
|---|---|---|---|---|---|---|---|---|---|---|
| 2 | 42 | 26 | 3.3 | 7.2 | *** | *** | *** | *** | 0.0303 | 52 |
| B | 48 | 19 | *** | 6.0 | *** | *** | *** | *** | 0.04071 | 36 |
| 3 | 42 | 30 | *** | 6.0 | 5.7 | *** | *** | *** | 0.0342 | 58 |
| 4 | 46 | 20 | 3.9 | *** | *** | *** | *** | 3.1 | 0.0157 | 38 |
| 5 | 36 | 18.7 | 3.5 | *** | *** | *** | 9.9 | *** | 0.0134 | 38 |
| 6 | 36 | 19 | 3.9 | *** | *** | 17 | *** | *** | 0.0332 | 62 |
| C | 48 | 30 | 11.7 | *** | *** | *** | *** | *** | 0.1027 | 72 |
| D | Katalco 52-1 | | | | | | | | 0.0881 | 52 |
| E | Haldor Topsoe | | | | | | | | 0.0732 | 58 |

*RATE OF DECLINE is the slope of the lines shown on the Figure.

Catalyst Testing in Water Gas Shift Reaction

An accelerated life test was designed to test the above prepared catalysts. In this test distilled water containing 37 ppm hydrogen chloride was injected into a syngas stream and the level of carbon monoxide conversion to carbon oxide was measured with a passage of time. It was estimated that this accelerated life test enhanced the aging phenomenon, or the decrease in activity of the catalyst, due to the chloride poisoning by 2 to 3 orders of magnitude. The following describes the specific accelerated test utilized.

In a vertical glass reactor was placed 1.47 g of freshly prepared catalyst admixed with 10 cc of inert 20-mesh silicon carbide. The catalyst was then reduced in a flow of hydrogen (100 cc/min) as the temperature was increased to 225° C. over a 2-hour period and then maintained for an additional two hours.

While controlling the temperature at 220° C., a 1:1 $CO/H_2$ mixture (394 cc/min) and distilled water containing 33 ppm of HCl (8.8 cc/hour) were simultaneously passed over the catalyst in the vaporized state. The rate of catalyst activity decline was determined by measuring the change in the level of CO conversion to $CO_2$ with the passage of time.

A large number of data points were measured and a trend analysis was made of the data points which was calculated by a leased squares method of integration (sometimes referred to as a simple linear regression) to indicate the change in real data. The slope of this trend curve provides for a rate of decline. These rates of declines are summarized in Table 1. Trend analysis curves are shown in the FIGURE. Various concentrations of calcium (Curve 1=8.2% Ca, Curve 2=7.2% Ca and Curve A=15.6% Ca) are shown as well as examples containing barium (Curve 6), strontium (Curve 5), magnesium (Curve 4) and neodymium instead of lanthanum (Curve 3). Curve B shows Cu/Zn/Ca. Two curves are also shown for commercial catalysts; Katalco 511 low temperature shift catalyst which is a copper oxide/zinc oxide/alumina catalyst (Curve D) and Chromite LSK (manufactured by Haldor Topsoe) which is a copper oxide/zinc oxide/chromium oxide catalyst (Curve E). As can be seen from Table 1 and the FIGURE catalyst compositions containing high amounts of alkaline earth metals, Example A, have high rates of decline. Catalysts samples not containing the rare earth, Example B, also have a relatively high rate of decline.

I claim:

1. A water gas shift catalyst composition having a high resistance to chloride poisoning which contains essentially of copper, zinc, a rare earth element and from about 5 to about 30 atomic weight percent of an alkaline earth element (basis total metals present) and which is prepared by a process comprising:
   (a) precipitating an aqueous solution of salts of copper, zinc and the rare earth element with an alkali metal or ammonium carbonate or bicarbonate precipitating agent,
   (b) collecting the precipitate of step (a),
   (c) reslurring the precipitate of step (b) with an aqueous solution of a salt of an alkaline earth element,
   (d) precipitating the slurried solution of step (c) with an alkali metal or ammonium carbonate or bicarbonate precipitating agent,
   (e) drying and calcining the precipitate of step (d) at a temperature between about 200° C. and 400° C. and
   (f) reducing the material of step (e) in a hydrogen-containing gas at a temperature between about 175° and about 400° C.

2. The composition of claim 1 wherein the Cu to Zn atomic ratio ranges from about 1:10 to about 10:1 and the rare earth element ranges from about 0.1 to about 10 atomic weight percent basis total metals present.

* * * * *